(12) United States Patent
Baugh (10) Patent No.: US 10,641,168 B1
(45) Date of Patent: May 5, 2020

(54) METHOD FOR VARIABLE DISPLACEMENT ENGINE

(71) Applicant: Benton Frederick Baugh, Houston, TX (US)

(72) Inventor: Benton Frederick Baugh, Houston, TX (US)

( * ) Notice: Subject to any disclaimer, the term of this patent is extended or adjusted under 35 U.S.C. 154(b) by 98 days.

(21) Appl. No.: 16/165,084

(22) Filed: Oct. 19, 2018

(51) Int. Cl.
| | |
|---|---|
| *F02D 15/02* | (2006.01) |
| *F02B 75/04* | (2006.01) |
| *F16H 1/16* | (2006.01) |
| *F16H 21/20* | (2006.01) |
| *F16H 19/00* | (2006.01) |
| *F02B 69/02* | (2006.01) |
| *F02D 15/00* | (2006.01) |

(52) U.S. Cl.
CPC ............ *F02B 75/047* (2013.01); *F02B 69/02* (2013.01); *F02B 75/048* (2013.01); *F02D 15/00* (2013.01); *F02D 15/02* (2013.01); *F16H 1/16* (2013.01); *F16H 19/001* (2013.01); *F16H 21/20* (2013.01)

(58) Field of Classification Search
CPC ...... F02B 75/047; F02B 75/048; F02B 75/04; F02B 69/02; F16H 1/16; F16H 21/20; F16H 19/001; F02D 15/00; F02D 15/04
See application file for complete search history.

(56) References Cited

U.S. PATENT DOCUMENTS

2002/0050252 A1* 5/2002 Moteki ................. F02B 75/045
123/48 B

* cited by examiner

*Primary Examiner* — Jacob M Amick (57) ABSTRACT

The method of providing an internal combustion engine with one or more variable sized combustion chambers providing pistons in the cylinders forming combustion chambers, providing the pistons with piston connecting rods which are pivotably connected to the pistons on one end and to floating pins on the second end, providing crankshaft connecting rods pivotably connected to rod journals on the crankshaft and to the floating pins on a second end, and moving the position of the crankshaft relative to the cylinders such that when the position of the crankshaft relative to the cylinders is changed, the operating characteristics of the engine are changed.

22 Claims, 10 Drawing Sheets

METHOD FOR VARIABLE DISPLACEMENT ENGINE

TECHNICAL FIELD

This invention relates to the method of providing an internal combustion engine with a variable displacement to allow the operation of the engine to be optimize for both high power requirement situations and low power requirement situations.

BACKGROUND OF THE INVENTION

Internal combustion engines are utilized for a wide variety of situations from transportation to stationary power generation. Some applications such as in stationary power generation will have the engine running at a single speed which allows the engine to be optimized to that situation. Other situations such as in highway transportation provide situations from acceleration to constant speed cruising to idling. Each of these require substantially different power requirements and often different speed requirements. A conventional engine cannot be optimized to operate in any of these conditions as it must operate in all the conditions. Compromises must be made to allow this flexibility.

An engine must be designed with enough combustion chamber capacity to produce the required power which dictates a volume of air which needs to pass through the engine to fill the combustion chamber capacity. When an engine is idling or is cruising at a constant speed, the same volume of air will pass through the engine during each revolution of the engine. As the engine must fire or ignite fuel with the air, enough fuel must enter the combustion chamber to allow this ignition.

One approach to eliminating this excess of fuel required has been done in some engines which simply block the air supply to some of the cylinders. In the case of an 8 cylinder engine, 2 or 4 of the cylinders have been blocked to theoretically cut the air and fuel volume by up to 50%. Other realities will limit this optimal result. Whereas this provided a better fuel economy, it caused problems with the resultant irregular heat patterns in the engines. It additionally provides only step changes which minimized the opportunity of optimization.

Changing the gearing between the engine and the wheels to run the engine as slowly as possible has provided some fuel efficiency. In the cruising situation at a normal driving speed the engine operates at a higher more efficient pressure than would happen if the engine were allowed to run faster in similar conditions. If more power is needed for acceleration at the same driving speed, the transmission can be downshifted to allow the higher engine rpm. This has limited advantage is some diesel engines as they optimally run at a specific RPM.

Another problem with internal combustion engines is that they are fuel grade sensitive. Changes in fuel from gasoline to diesel fuel and from low octane to high octane fuel dictate different compression ratios in engines. The compression ratio is the size of the combustion chamber at its largest volume to the size of the combustion chamber at the smallest volume. This is generally when the rod journal or eccentric on the crankshaft is at the bottom of a rotation and when the crankshaft rod journal or eccentric is at the top of a rotation. The typical compression ratios of gasoline type engines are in the range of 8-11/1 and for diesel engines are in the range of 14-20/1.

The changes in these compression ratios is so significant that the gasoline type engines have ignition based upon a spark plug within the cylinder initiating the ignition. On a diesel engine the more intense pressure and resulting temperature generated by the rapid compression causes the fuel to explode without a spark plug.

Although the need for a variable displacement engine has long been recognized, there have been no suitable solutions provided prior to this invention for an internal combustion engine with an infinitely variable displacement which can be changed while the engine is in operation as well as changing the compression ratio of the engine.

BRIEF SUMMARY OF THE INVENTION

The object of this invention is to provide an internal combustion engine with a variable displacement.

A second object of this invention is to provide an internal combustion engine with a variable displacement without causing irregular heating patterns within the engine.

A third objective of this invention is to provide an internal combustion engine with a variable displacement by varying the stroke of the pistons within the engine.

Another objective of the invention is to provide an internal combustion engine with a variable displacement by varying the stroke of the pistons within the engine without changing the compression ratio of the engine.

Another objective of the invention is to provide an internal combustion engine with a variable displacement by varying the stroke of the pistons within the engine and changing the compression ratio of the engine to allow for the use of different type fuels.

BRIEF SUMMARY OF THE INVENTION

The object of this invention is to provide an internal combustion engine with a variable compression ratio.

A second object of this invention is to provide an internal combustion engine with a variable compression ratio which will allow fuels of different octane ratings to be used without the engine knocking A third objective of this invention is to provide an internal combustion engine with a variable compression ratio which can be adjusted while the engine is running.

DETAILED DESCRIPTION OF THE INVENTION

Figure 1:
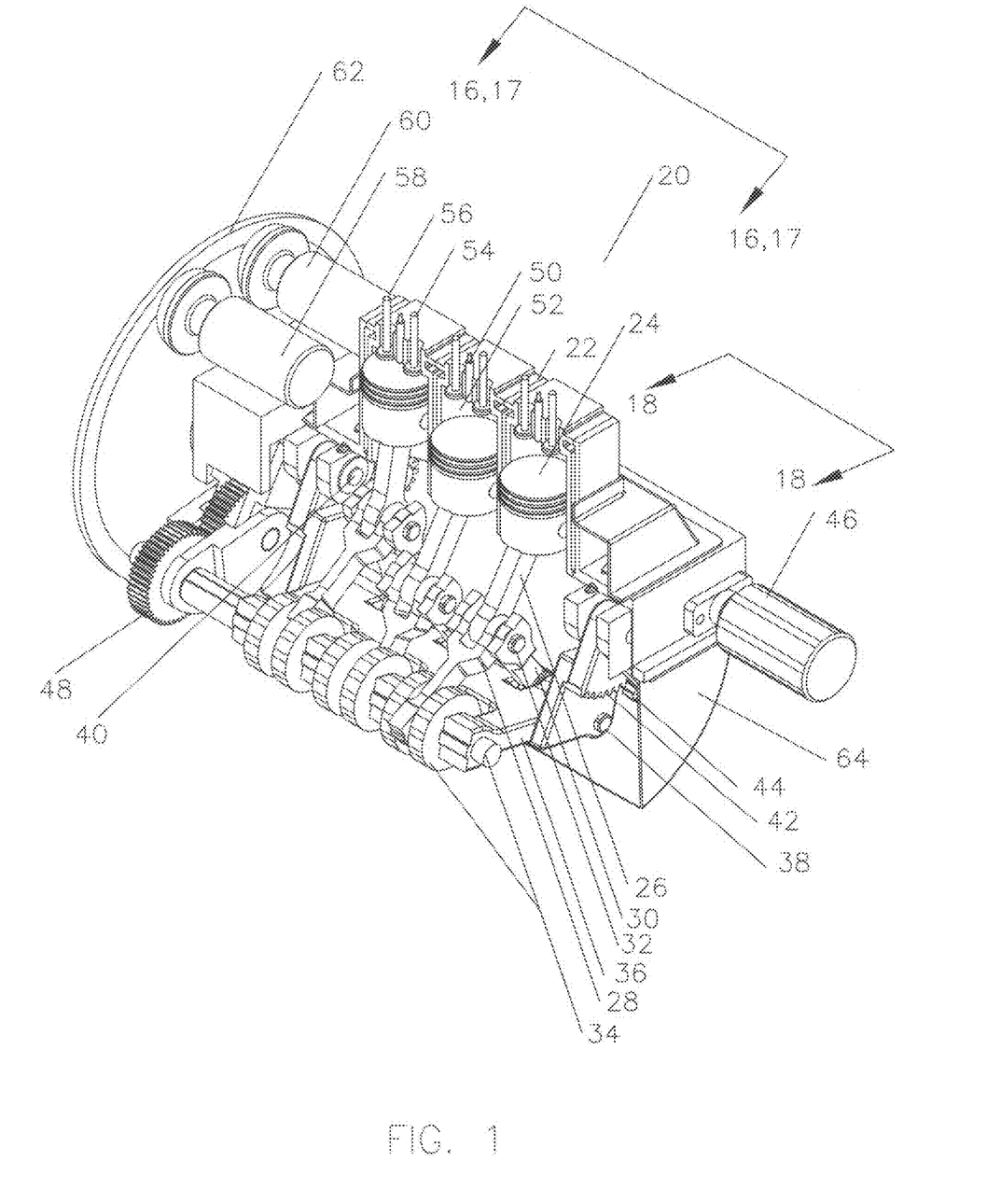
FIG. 1 shows a perspective cutaway of an internal combustion engine.

Referring now to FIG. 1, a perspective cutaway of an internal combustion engine 20 is shown with engine block 22 housing piston 24 which is connected to piston connecting rod 26. Piston connecting rod 26 is connected to crankshaft connecting rod 28 and idler connecting rod 30 by floating pin 32. Crankshaft connecting rod 28 is also connected to crankshaft 34 which is mounted in swivel 36. Idler connecting rod 30 is also connected to swivel 36 at idler arm pivot axle 38. Swivel 36 rotates about pivot pin 40 and is driven by gear 42. Gear 42 is driven by gear 44 which is in turn driven by rotator 46, as will be discussed later. Crankshaft 34 drives gear 48 which delivers the engine power to the drive shaft which will be discussed later.

Fuel injector 50 is shown in a position to inject fuel into combustion chamber 52. Intake valve 54 and exhaust valve 56 are illustrated. Valve operating cams and exhaust manifolds are not illustrated as they are well known in the art. Starter 58 and generator 60 are shown mounted on flywheel housing 62. A portion of oil pan 64 is shown below the engine block 22.

Figure 2:
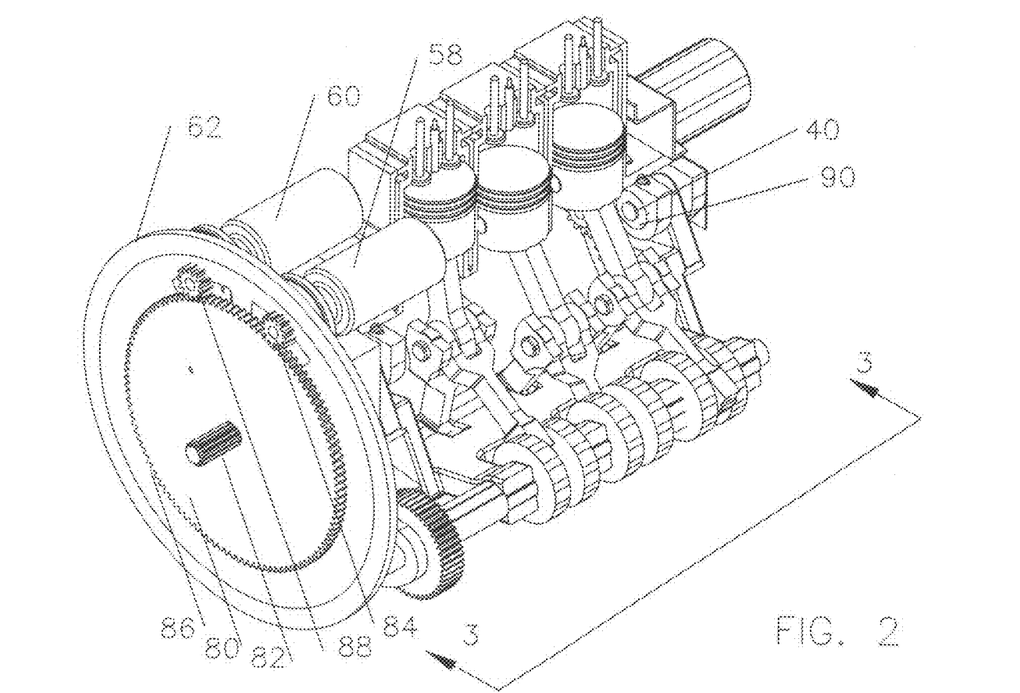
FIG. 2 shows a perspective similar to FIG. 1 generally from the rear left of the engine.

Referring now to FIG. 2, a perspective similar to FIG. 1 is shown generally from the rear left of the engine rather than from the front left. It is the same drawing rotated about 90 degrees. Flywheel 80 is shown around drive shaft 82. Starter gear 84 engages the gearing 86 on the flywheel 80 as does the generator gear 88. Pivot pin 40 is shown surrounded by eccentric worm wheel bushings 90 to change the axis of rotation of swivel 36 to the compression ratio of the engine will be discussed later.

Figure 3:
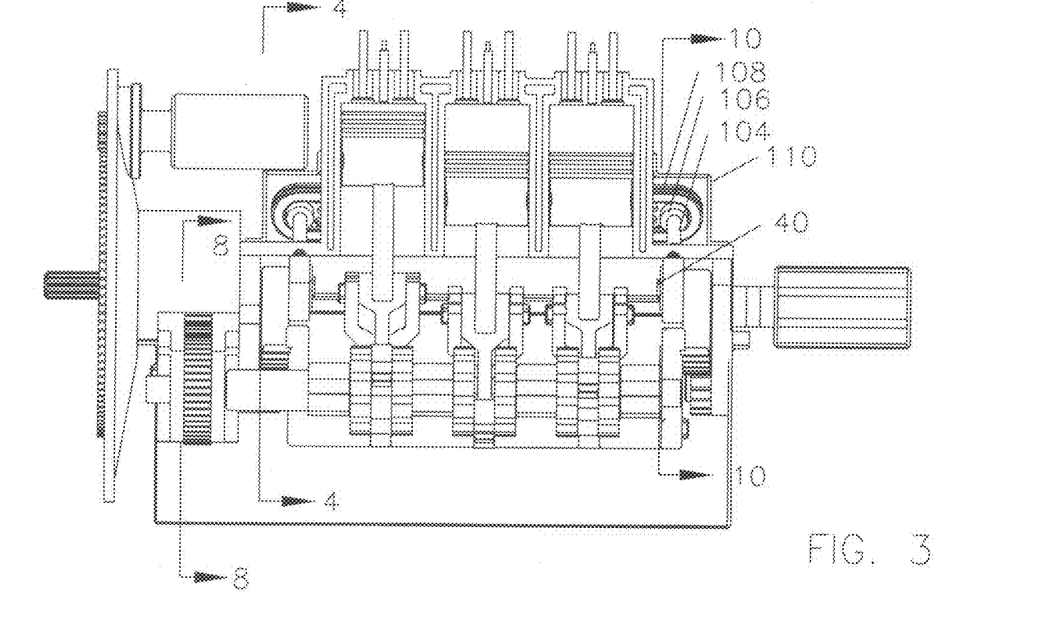
FIG. 3 shows which is taken along lines "3-3" of FIG. 2.

Referring now to FIG. 3 which is taken along lines "3-3" of FIG. 2, shows worm screw 104, sprocket 106, chain 108 and chain cover 110 which are used to rotate eccentric worm wheel bushings 90.

Figure 4:
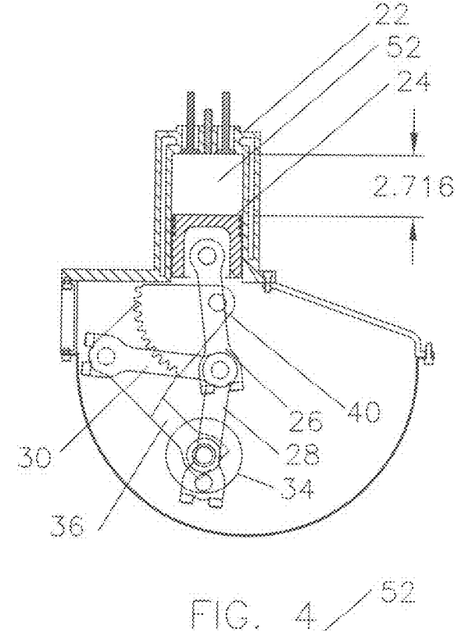
FIG. 4 shows which is generally taken along lines "4-4" of FIG. 3.

Referring now to FIG. 4 which is generally taken along lines "4-4" of FIG. 3 shows the piston 24 at the bottom of the stroke in which will be referred to as the zero degrees rotation of the swing 36 about pivot pin 40, which provides the longest stroke position. Piston connecting rod 26, crankshaft connecting rod 28, idler connecting rod and crankshaft 34 are all shown if full section for understanding the concept although they represent layers on top of each other. It should be noted that the length of the combustion chamber 52 in the head 22 is presently 2.716 inches.

Figure 5:
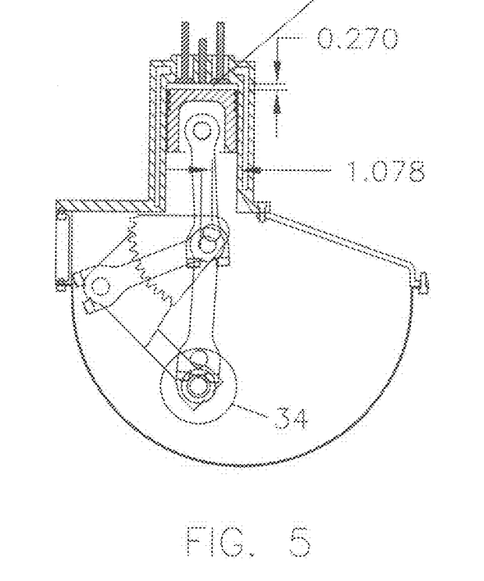
FIG. 5 shows the crankshaft has been rotated 180 degrees to the top position.

Referring now to FIG. 5, crankshaft 34 has been rotated 180 degrees to the top position and as a result the length of the combustion chamber 52 has been reduced to 0.270 inches. The 2.716 divided by 0.270 gives a compression ratio of 10.059/1, which is appropriate for a gasoline type engine.

Figure 6:
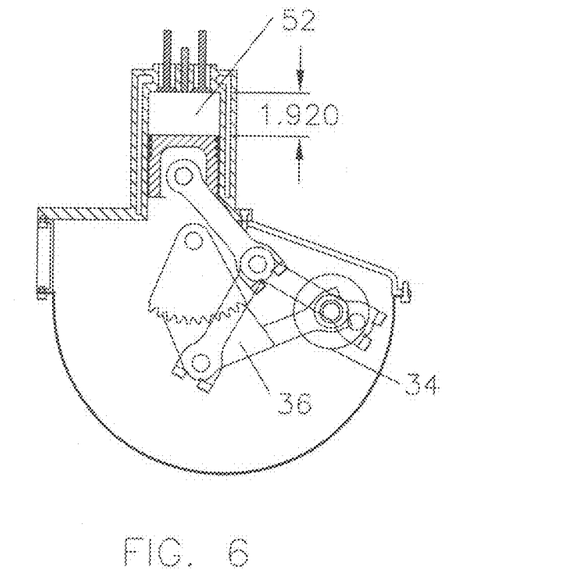
FIG. 6 shows the crankshaft is again rotated to the lowest position after other internal parts have been rotated.

Referring now to FIG. 6, the crankshaft 34 is again rotated to the lowest position, but the swing 36 has been rotated to the 67.5 degree position, resulting in the length of the combustion chamber 52 being reduced to 1.920 inches.

Figure 7:
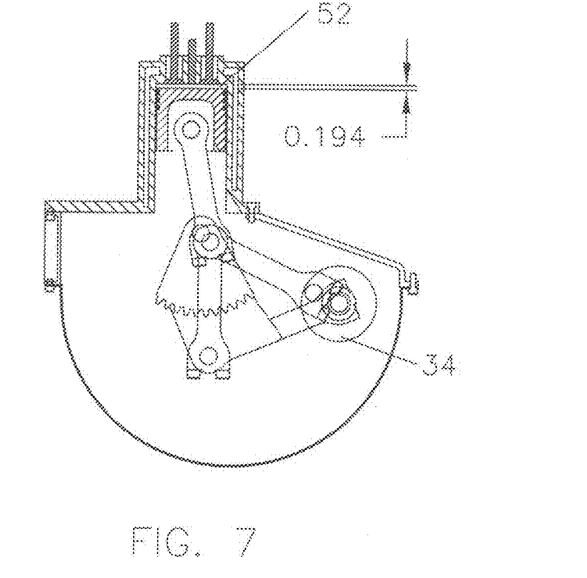
FIG. 7 shows the crankshaft has again been rotated 180 degrees.

Referring now to FIG. 7, the crankshaft 34 has again been rotated 180 degrees and the length of the combustion chamber 52 has been reduced to 0.194 inches. The 1.920/0.194 gives a compression ration of 9.897/1, which again is suitable for a gasoline engine.

Figure 8:
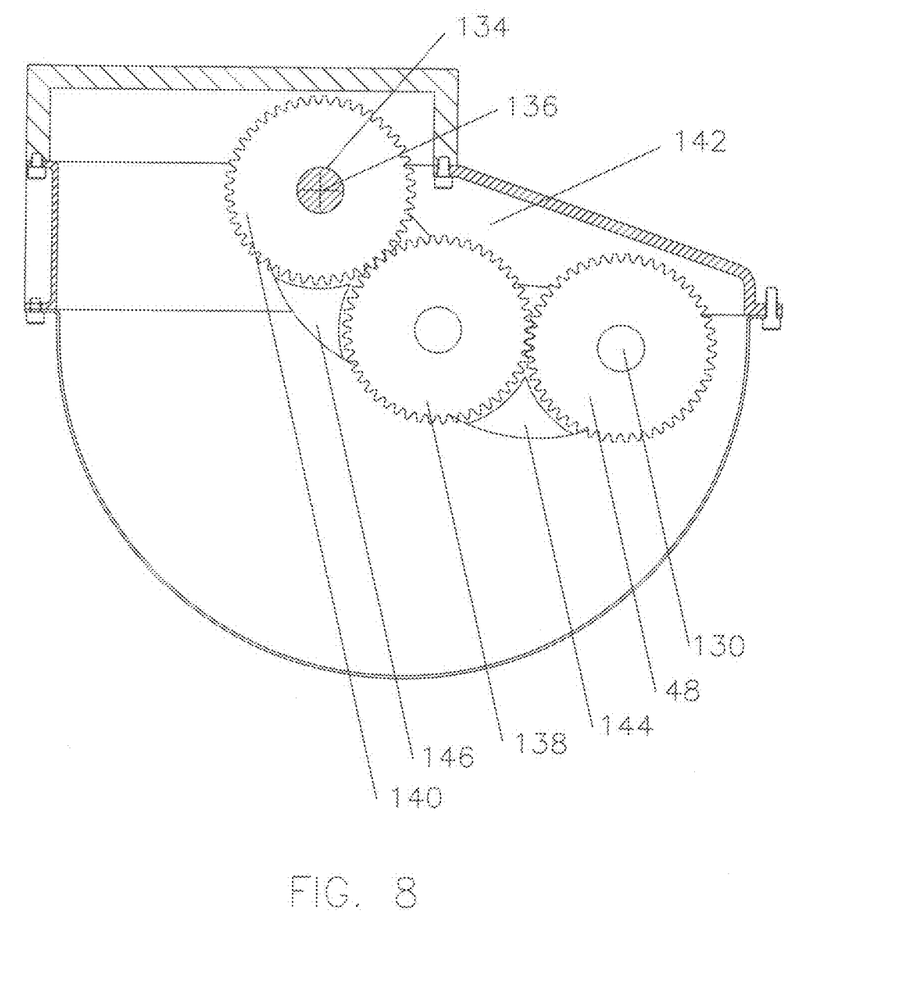
FIG. 8 shows which is taken along lines "8-8" of FIG. 3.

Referring now to FIG. 8 which is taken along lines "8-8" of FIG. 3, the end 130 of crankshaft 34 is shown with drive gear 48 mounted on it. Section 134 of drive shaft 82 is shown with the centerline 136 of drive shaft 82 being indicated. Drive gears 48, 138, and 140 represent a power train 142 to get the output power from crankshaft 34 to the drive shaft 82 as crankshaft 34 swings in an arc. The drive gears 48, 138, and 140 being mounted on links 144 and 146

Figure 9:
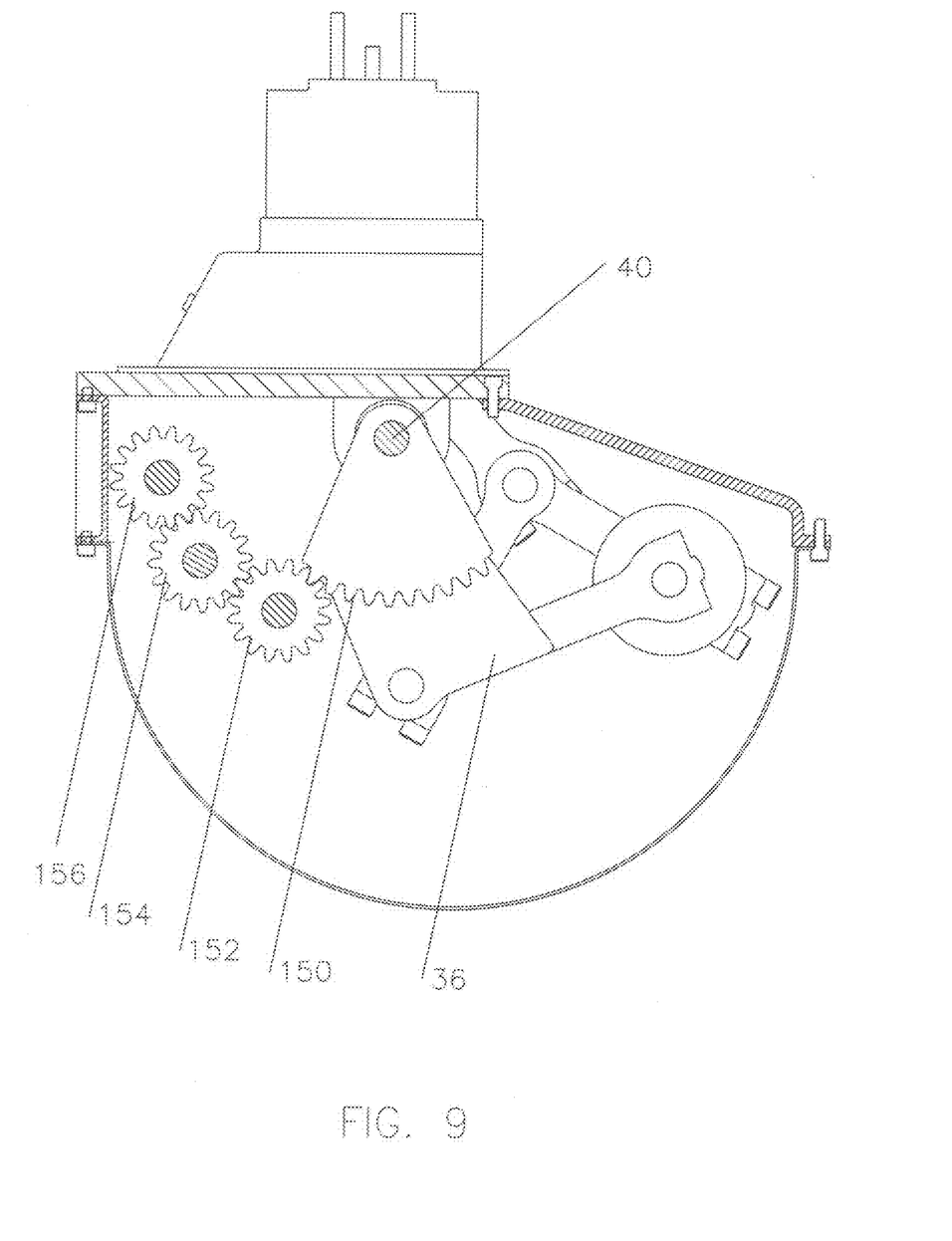
FIG. 9 shows which is taken along lines "4-4" of FIG. 3.

Referring now to FIG. 9 which is taken generally along lines "4-4" of FIG. 3, shows swivel 36 having a gear profile 150 which is engaged by gears 152, 154, and 156 in turn. Gears 152, 154, and 156 will be used to rotate the swivel about pivot pin 40 using rotator 46

Figure 10:
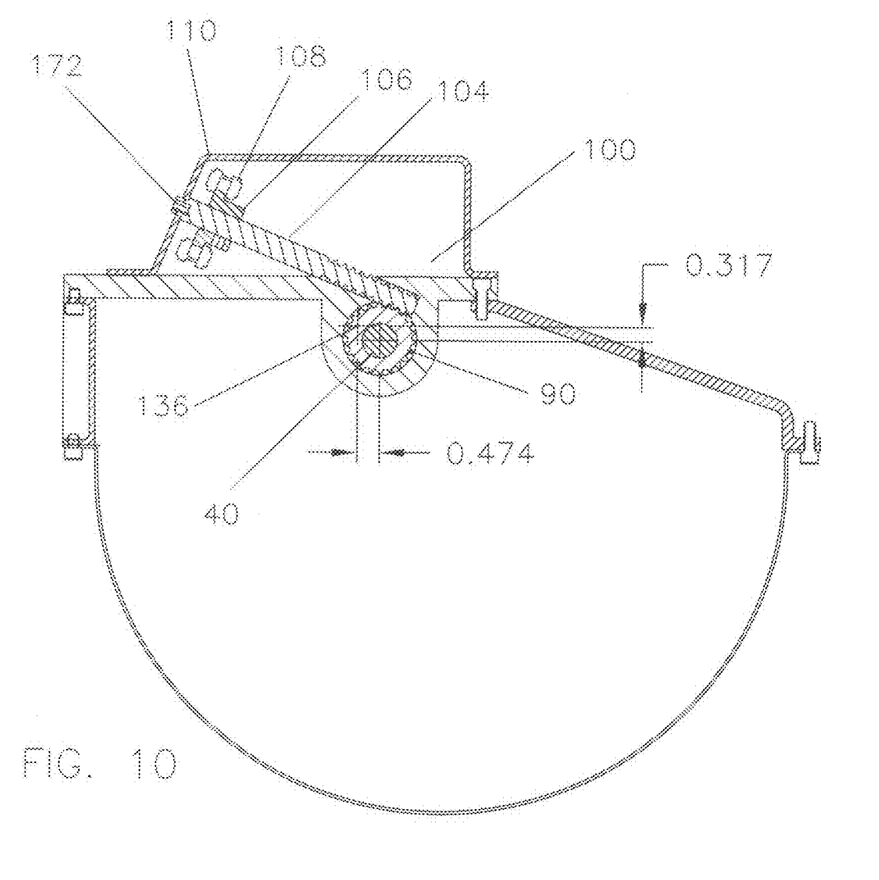
FIG. 10 shows which is taken along lines "10-10" of FIG. 3.

Referring now to FIG. 10 which is taken generally along lines "10-10" of FIG. 3, pivot pin 40 is shown to be mounted in eccentric worm wheel bushing 90. In the present position which facilitated the engine remaining with a relatively constant compression ratio during the swiveling of swivel 36 from the zero degrees position to the 67.5 degrees position. Profile 172 such as a recessed hex is provided for the rotation of worm screw 104. Centerline 136 of the drive shaft as seen in FIG. 8 is shown and the centerline of pivot pin 40 is shown to be 0.474 in the "X" direction and -0.317 in the "Y" direction from centerline 136.

Figure 11:
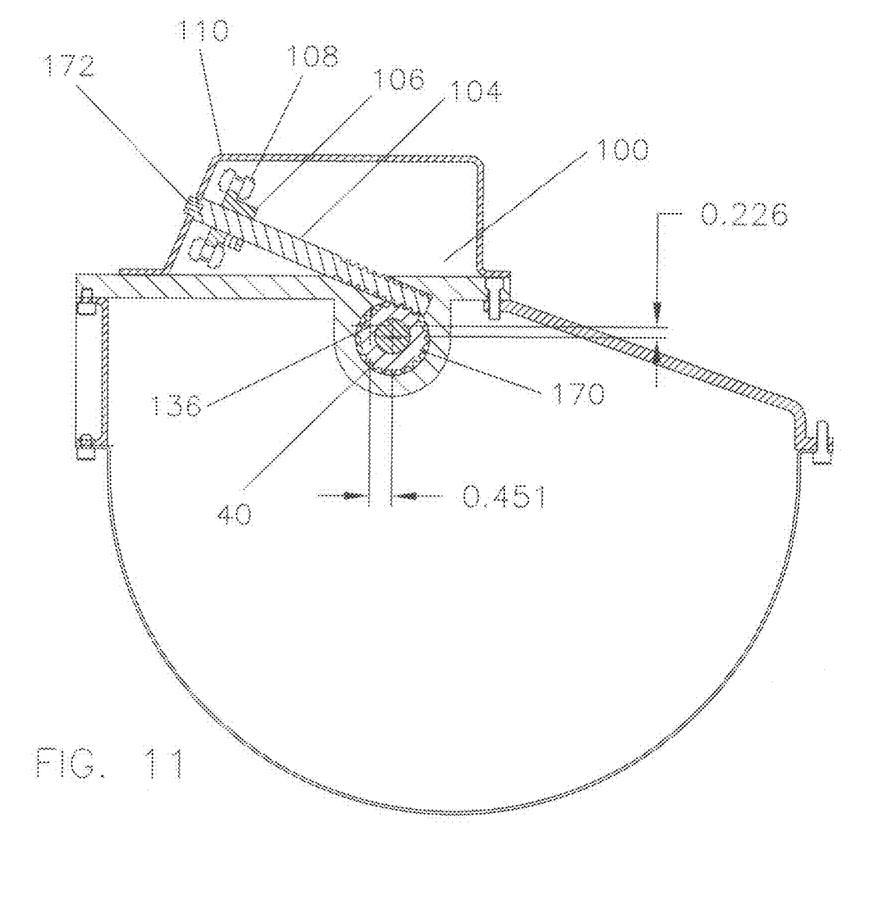
FIG. 11 shows a profile has been turned to rotate the worm wheel bushing.

Referring now to FIG. 11, profile 172 has been turned to rotate the worm wheel bushing 170 180 degrees moving the centerline of pivot pin 40 is to be 0.451 in the "X" direction and −0.226 in the "Y" direction from centerline 136. This moves all the moving parts upwardly in the engine and will act to increase the compression ratio of the engine.

Figures 12, 14:
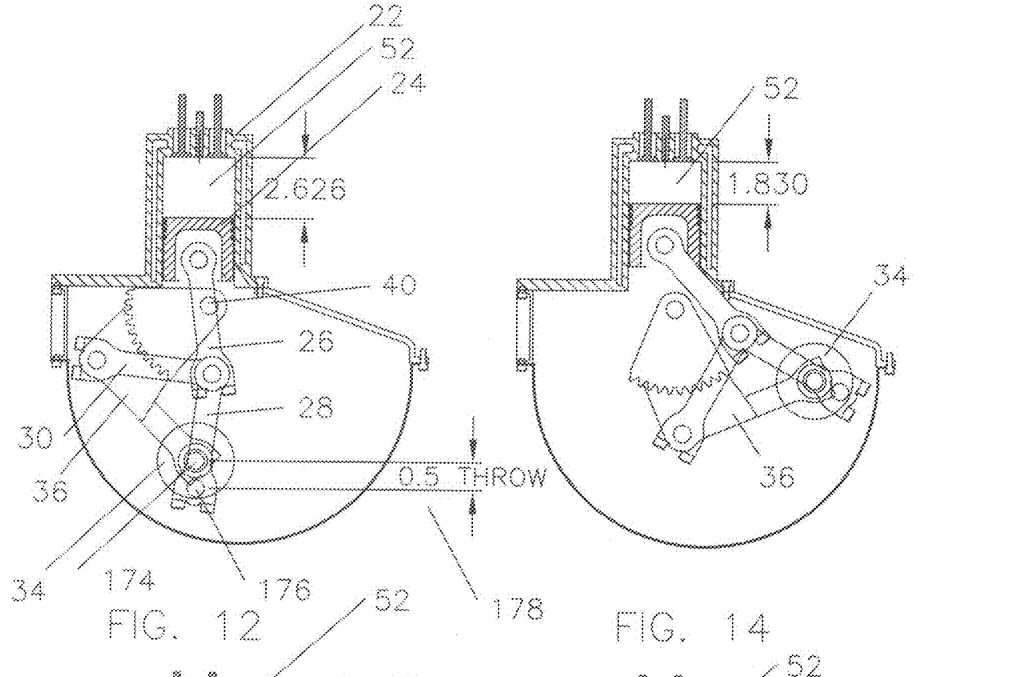
FIG. 12 shows which is generally taken along lines "4-4" of FIG. 3.
FIG. 14 shows the crankshaft is again rotated to the lowest position after other internal parts have been rotated.

Referring now to FIG. 12 which is generally taken along lines "4-4" of FIG. 3 shows the piston 24 at the bottom of the stroke in which will be referred to as the zero degrees rotation of the swivel 36 about pivot pin 40, which provides the longest stroke position. Piston connecting rod 26, crankshaft connecting rod 28, idler connecting rod 30 and crankshaft 34 are all shown in full section for understanding the concept although they represent layers on top of each other. It should be noted that the length of the combustion chamber 52 in the head 22 is presently 2.626 inches.

Crankshaft 34 is shown with the main journal at 174, the rod journal 176 and one half the throw distance is shown at 178. The main journal 174 is the portion of the crankshaft 34 which rotates concentrically when the crankshaft 34 rotates. The rod journal is the bearing portion of the crankshaft which functionally orbits the main journal 174 as the crankshaft 34 rotates. The throw distance is the vertical distance the rod journal travels in going from top dead center to the bottom of the stroke.

Figure 13:
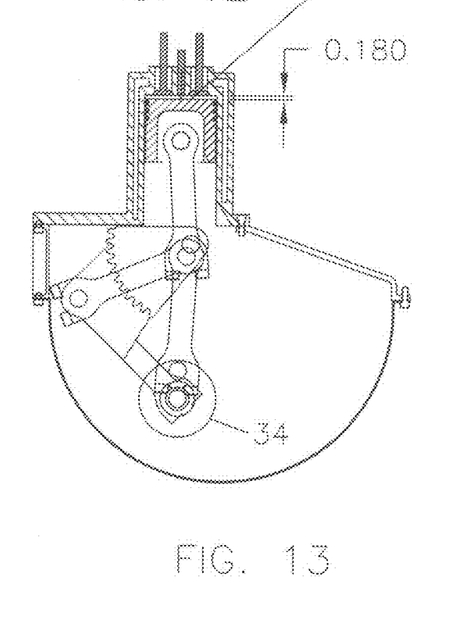
FIG. 13 shows the crankshaft has been rotated 180 degrees to the top position.

Referring now to FIG. 13, crankshaft 34 has been rotated 180 degrees to the top position and as a result the length of the combustion chamber 52 has been reduced to 0.180 inches. The 2.626 divided by 0.180 gives a compression ratio of 14.56/1, which is appropriate for a diesel type engine.

Referring now to FIG. 14, the crankshaft 34 is again rotated to the lowest position, but the swivel 36 has been rotated to the 67.5 degree position, resulting in the length of the combustion chamber being reduced to 1.830 inches.

Figure 15:
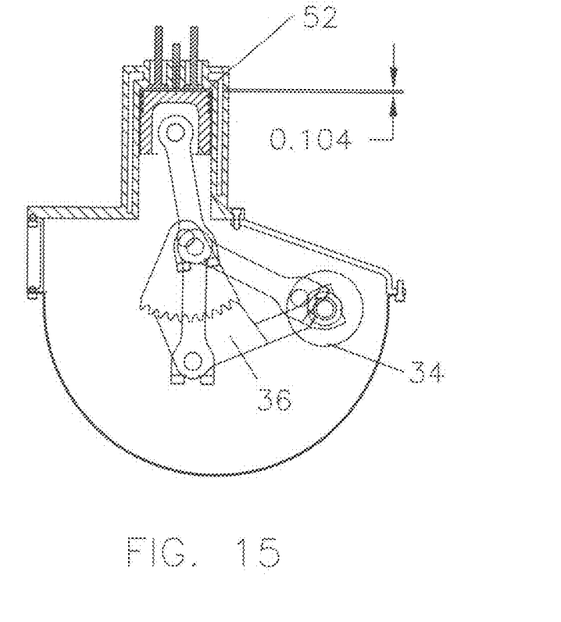
FIG. 15 shows the crankshaft has again been rotated 180 degrees.

Referring now to FIG. 15, the crankshaft 34 has again been rotated 180 degrees and the length of the combustion chamber 52 has been reduced to 0.104 inches. The 1.830/ 0.104 gives a compression ratio of 17.59/1, which again is suitable for a diesel engine.

Figure 16:
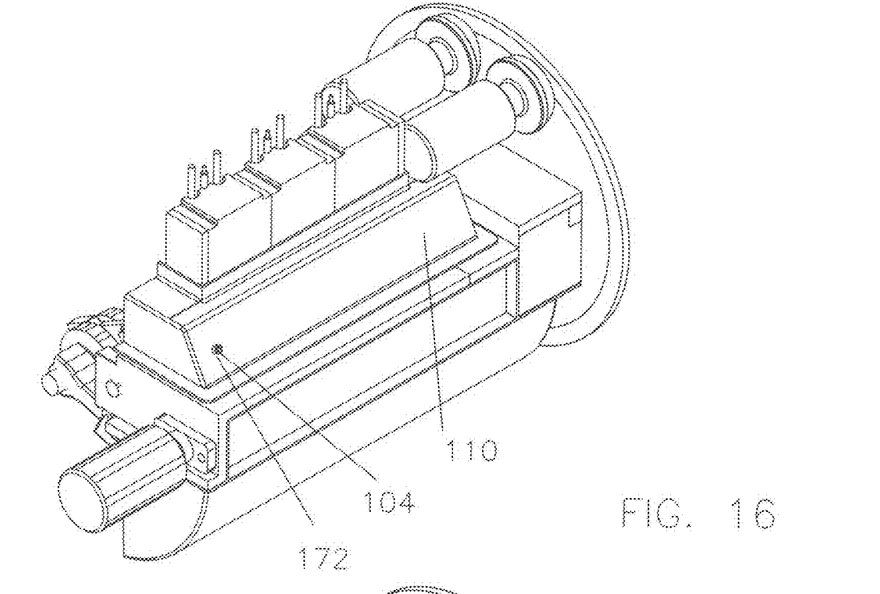
FIG. 16 shows which is a view taken along lines "16-16" in FIG. 1.

Referring now to FIG. 16, which is a view taken along lines "16-16" in FIG. 3, worm screw 104 can be seen penetrating chain cover 110, and having profile 172 on its end.

Figure 17:
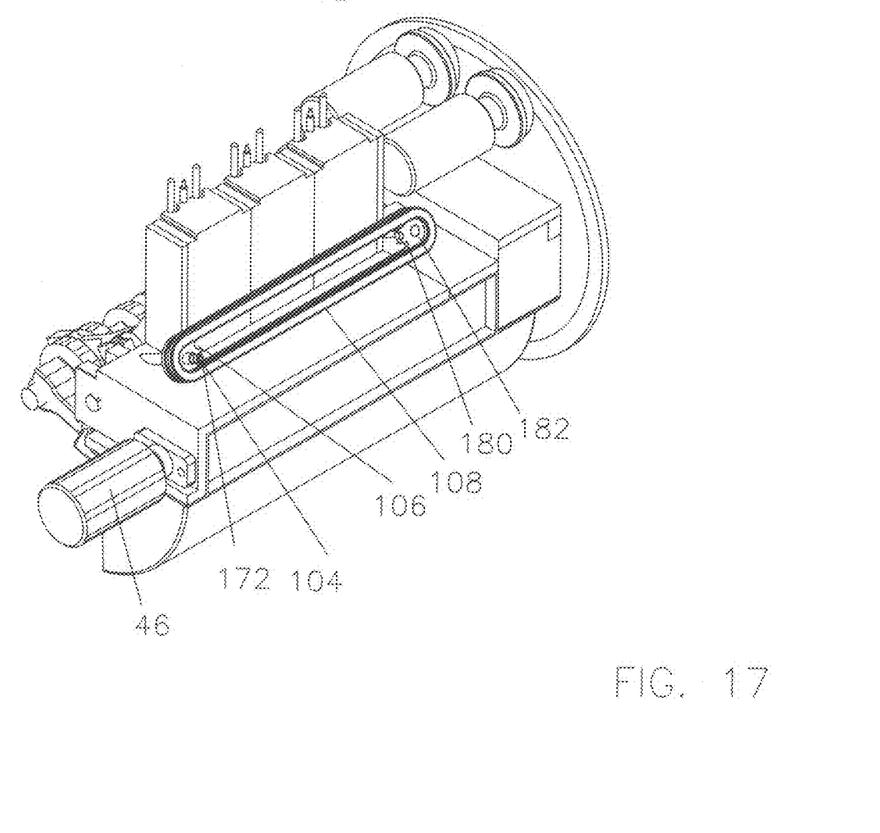
FIG. 17 shows which is the same view as FIG. 16 with the chain cover removed.

Referring now to FIG. 17, which is the same view as FIG. 16 with the chain cover 110 removed, it can be seen that there are two sprockets 106 and 180 mounted on worm screw 104 with profile 172 and worm screw 182 without an end profile The chain 108 allows both worm screws 104 and 182 to be turned by a single tool profile 172. A rotator such as rotator 46 can be added to worm screw 104 to allow remote or automatic control of the location adjustments of the pins 40. By adjusting both the stroke of the engine and the compression ratio, the greatest fuel economy ratio can be achieved.

Figure 18:
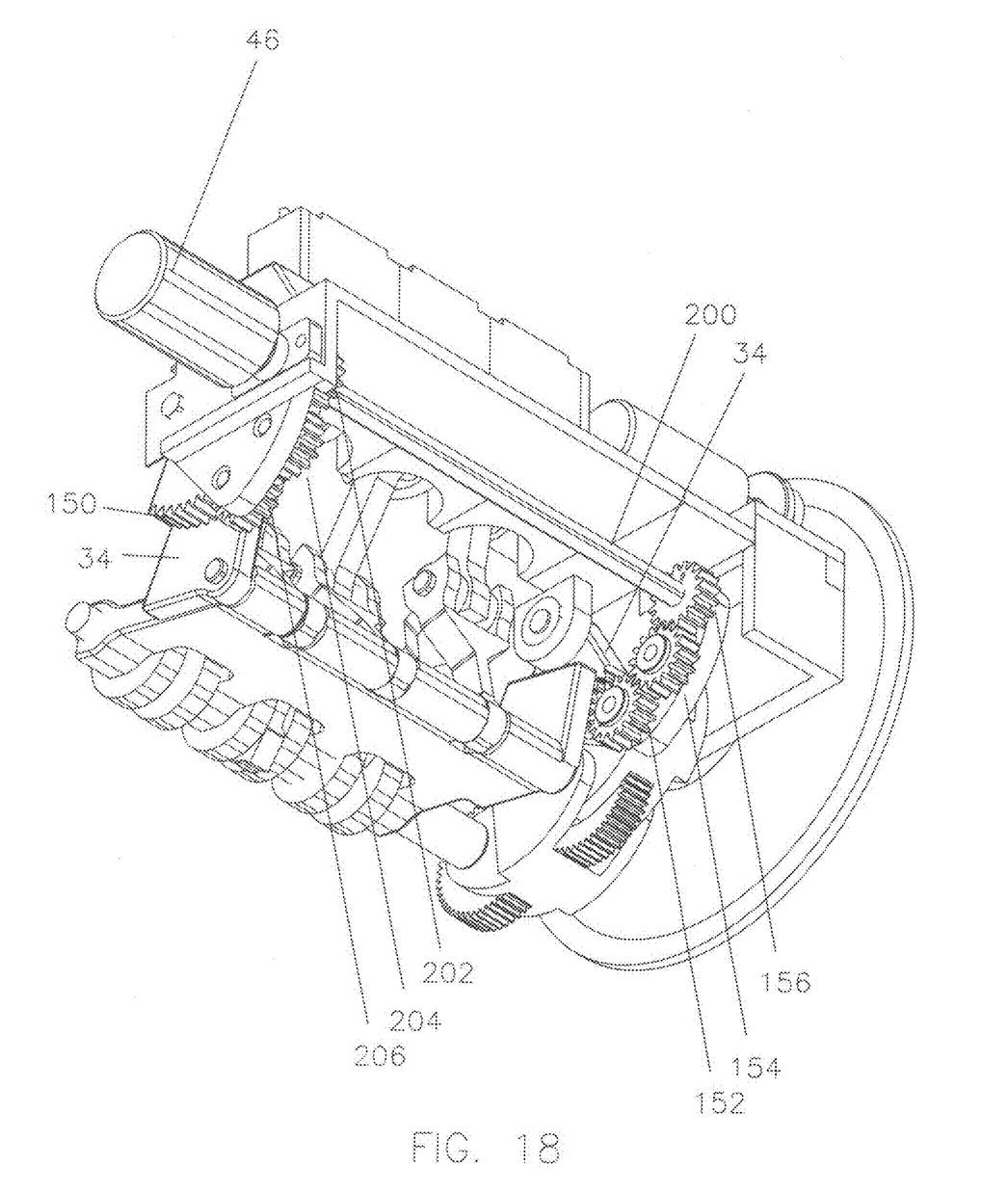
FIG. 18 shows which is a view taken along lines "18-18" of FIG. 1.

Referring now to FIG. 18, which is a view taken along lines "18-18" of FIG. 1 with the oil pan 64 removed shows rotator 46 connected to shaft 200 and driving gears 152, 154, and 152 on one end and gears 202, 204, and 206 on the other end Gears 152 and 206 engage gear profile 150 of swivel 34 to rotate the swivel 34 as required. Rotator 46 can be an electrical stepping motor, other type electrical motor with an appropriate reducer, a hydraulic motor, a cylinder on a lever arm, or other types of devices.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below. internal combustion engine 20 engine block 22 piston 24 piston connecting rod 26 crankshaft connecting rod 28 idler connecting rod 30 floating pin 32 crankshaft 34 swivel 36 idler arm pivot axle 38 pivot pin 40 gear 42 gear 44 rotator 46 gear 48 Fuel injector 50 combustion chamber 52 Intake valve 54 exhaust valve 56 Starter 58 generator 60 flywheel housing 62 oil pan 64 Flywheel 80 drive shaft 82 Starter gear 84 gearing 86 generator gear 86 worm screw 104 sprocket 106 chain 108 chain cover 110 combustion chamber 120 head 122 end 130 centerline 136 Drive gears 48, 138, and 140 power train 142 links 144 and 146 gear profile 150 gears 152, 154, and 156 eccentric worm wheel bushing 170. Profile 172 main journal at 174 rod journal 176 one half the throw distance is shown at 178 two sprockets 106 and 180 worm screw 182 shaft 200 gears 202, 20, and 206

That which is claimed is:

1. A method of providing an internal combustion engine with one or more variable sized combustion chambers, comprising providing one or more pistons in one or more cylinders forming one or more combustion chambers, providing said one or more pistons with one or more piston connecting rods which are pivotably connected to said one or more pistons on a first end and to one or more floating pins on a second end, providing one or more crankshaft connecting rods pivotably connected to one or more rod journals on a crankshaft on a first end and to said one or more floating pins on a second end, and moving the position of said crankshaft relative to said cylinders such that when the position of said crankshaft relative to said cylinders is changed, the operating characteristics of the engine are changed.

2. The method of claim 1 further comprising providing a pivoting assembly for supporting said crankshaft comprising a body, one or more idler connecting rods, an idler connecting rod axle, and a pivot, said pivoting assembly pivoting about said pivot, and said one or more idler connecting rods being connected to said idler connecting rod axle on a first end and to said one or more floating pins on a second end.

3. The method of claim 2 further comprising that as the crankshaft is rotated the position of said one or more floating pins is determined by said one or more second ends of said crankshaft connecting rods and by said one or more second ends of said idler connecting rods.

4. The method of claim 3 further comprising such that the position of said one or more pistons is determined by said one or more piston connecting rods being connected to said one or more floating pins and said one or more pistons.

5. The method of claim 4 further comprising said cylinders having a centerline such that when said pivoting assembly is pivoted about said pivot, the average angle between the movement of said second end of said one or more idler connecting rods changes resulting in the component of the movement of said one or more floating pins parallel to the centerline of said one or more cylinders changing, changing the stroke of said one or more pistons within said one or more cylinders and therefore changing the size of the combustion chamber.

6. The method of claim 5 further comprising positioning said pivot such that as said pivoting assembly pivots the minimum volume of said combustion chamber is proximately a fixed percentage of the maximum volume of said combustion chamber in order to provide proximately a constant compression ratio.

7. The method of claim 2 further comprising providing a rotator which will rotate said pivoting assembly.

8. The method of claim 7 further comprising said rotator is a stepping motor.

9. The method of claim 2 further comprising providing a gear train to deliver the rotary torque from said crankshaft to a stationary rotating drive shaft.

10. The method of claim 2 further comprising adjusting the position of the pivot to change the compression ratio of the engine.

11. The method of claim 10 further comprising mounting said pivot on one or more eccentric bushings such that the rotation of said one or more eccentric bushing changes said position of said pivot.

12. The method of claim 1 further comprising mounting said crankshaft main journals on one or more eccentric bushings such that the rotation of said one or more eccentric bushing changes said position of said crankshaft.

13. The method of claim 12 further comprising linking said one or more eccentric bushings together to cause them to rotate at the same time.

14. The method of claim 12 further comprising said one or more eccentric bushings have a worm wheel profile on their outer diameter and are rotated by one or more worm gears.

15. The method of claim 14 further comprising linking said one or more worm gears together to cause them to rotate at the same time.

16. The method of claim 1 further comprising varying both said volume of said combustion chamber and said compression ratio of said combustion chamber for maximum efficiency.

17. A method of providing an internal combustion engine with one or more variable sized combustion chambers, comprising providing one or more pistons in one or more cylinders forming one or more combustion chambers, providing said one or more pistons with one or more piston connecting rods which are pivotably connected to said one or more pistons on a first end and to one or more rod journals on a crankshaft on a second end, moving the position of said crankshaft relative to said cylinders such that when the position of said crankshaft relative to said cylinders is changed, the operating characteristics of the engine are changed.

18. The method of claim 17 further comprising adjusting the position of said crankshaft to change the compression ratio of the engine.

19. The method of claim 18 further comprising mounting said crankshaft main journals on one or more eccentric bushings such that the rotation of said one or more eccentric bushing changes said position of said crankshaft.

20. The method of claim 19 further comprising linking said one or more eccentric bushings together to cause them to rotate at the same time.

21. The method of claim 19 further comprising said one or more eccentric bushings have a worm wheel profile on their outer diameter and are rotated by one or more worm gears.

22. The method of claim 21 further comprising linking said one or more worm gears together to cause them to rotate at the same time.

\* \* \* \* \*